Oct. 18, 1938.　　　　D. S. NEAL　　　　2,133,396
ROTARY MATERIAL DISTRIBUTOR FOR MATERIAL HANDLING APPARATUS
Filed Oct. 5, 1936　　　2 Sheets-Sheet 1
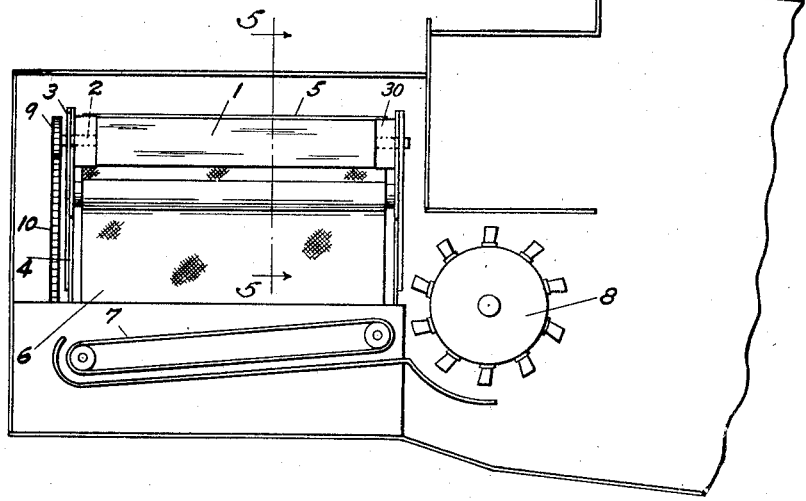
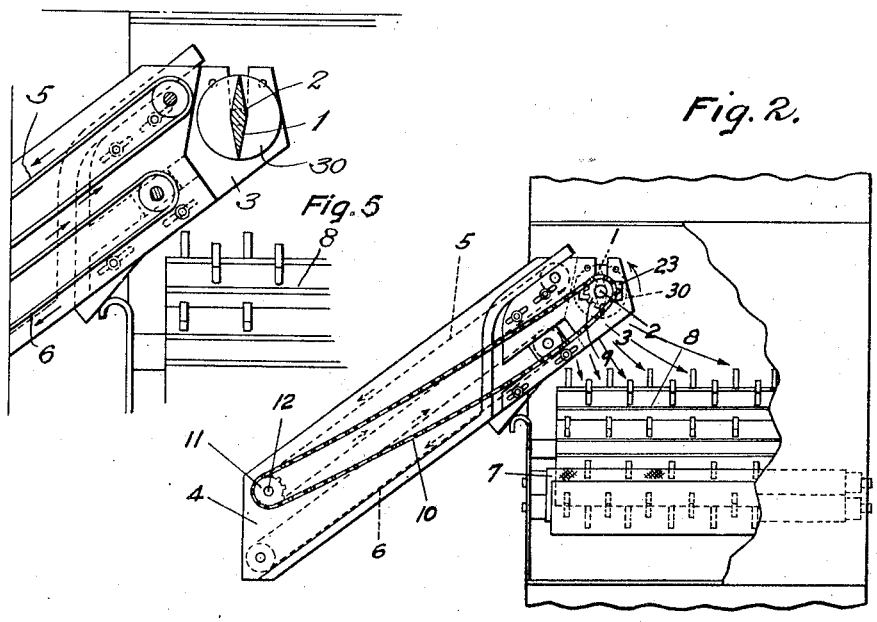
INVENTOR.
David S. Neal
BY
W. S. Babcock
ATTORNEY.

Oct. 18, 1938.    D. S. NEAL    2,133,396
ROTARY MATERIAL DISTRIBUTOR FOR MATERIAL HANDLING APPARATUS
Filed Oct. 5, 1936    2 Sheets-Sheet 2

INVENTOR.
David S. Neal
BY W. S. Babcock
ATTORNEY

Patented Oct. 18, 1938

2,133,396

UNITED STATES PATENT OFFICE 2,133,396

ROTARY MATERIAL DISTRIBUTOR FOR MATERIAL HANDLING APPARATUS

David S. Neal, Harrod, Ohio

Application October 5, 1936, Serial No. 104,010

3 Claims. (Cl. 198—102)

The invention to be hereinafter described relates to rotary grain deflectors for harvesting machines.

Actually, the deflector may be considered as cooperating either with the harvester or with the thresher. It really cooperates with both. As the grain passes from the conveyor of the harvester into the feeder house of the thresher the deflector performs its functions.

It is quite general now, as is well understood, to use a single machine as a combine, to simultaneously harvest and thresh wheat and other grain crops. It derives its name from the fact that it comprises two separate machines simply and compactly combined into one, yet each performing all of its regular functions in usual and well known manner. The delivery conveyor of the harvester travels at right angles to the path of the travel of the machine. It extends at right angles to the length of the thresher. From the feeder house, the grain is fed by a conveyor to the threshing cylinder, in usual manner. For efficiency and proper threshing the grain should be fed to all parts of the threshing cylinder equally, both as to rate of speed, so that the grain will not accumulate, and uniformly as to depth of straw over the surface of the feeder conveyor, so that there will be no point at which there may be clogging while other points are without a normal amount. Unequal feeding, especially as to depth, results in clogging of the cylinder, unequal strains on the source of power and frequent stoppages of the machine. And that is one of the most serious difficulties with combines as now constructed and arranged. Any conveyor belt speed sufficient to deliver the grain from the harvester into the feeder house is also sufficient to "shoot" it clear across the feeder house against the opposite side or wall so that it piles up deep on that side of the feeding conveyor, in front of that end of the cylinder and leaves the near side with little or no grain—the grain is piled deep at one side of the feeder house and cylinder end while there is no grain, appreciably, at the opposite side, with graduated thinness in between, across the conveyor. Obviously, where this deep pile of grain is fed, by the conveyor, to the corresponding end of the cylinder and cooperating concave, there will be a choking action and incomplete threshing, and very unequal or unbalanced strains on the cylinder. Frequently, the piling is so bad as to seriously clog the feeder house. At such times, an operator must pull out the clogging straw, which is very disagreeable and wasteful of time and money. For this, the machine must be brought to a stop. On occasions, these stoppages are very frequent totaling a large part of an entire day's work with accompanying loss.

The present invention completely eliminates the above and many other objections and provides a means for distributing the grain evenly and uniformly on the bottom of the feeder house so that there will be no piling, with consequent clogging, and no uneven strains on the cylinder. By it, there will be an even, uniform feed of the grain, balanced strains on the cylinder, efficient threshing operation and greatly increased speed in feeding of the grain from the harvester conveyor to the cylinder.

In order to more clearly disclose the construction, operation and use of the invention, reference should be had to the accompanying drawings forming part of the present application. Throughout the several figures of the drawings like reference characters designate the same parts in the different views.

In the drawings:

Fig. 1 is a fragmentary side view of the forward part of a combine broken away to show the invention applied;

Fig. 2 is a front view of the same, omitting all of the harvester except the conveyors leading from the knife to the feeder house of the thresher;

Fig. 5 is an enlarged detail fragmentary view on the line 5—5 of Fig. 1, looking in the direction of the arrows.

Figures 3, 4:
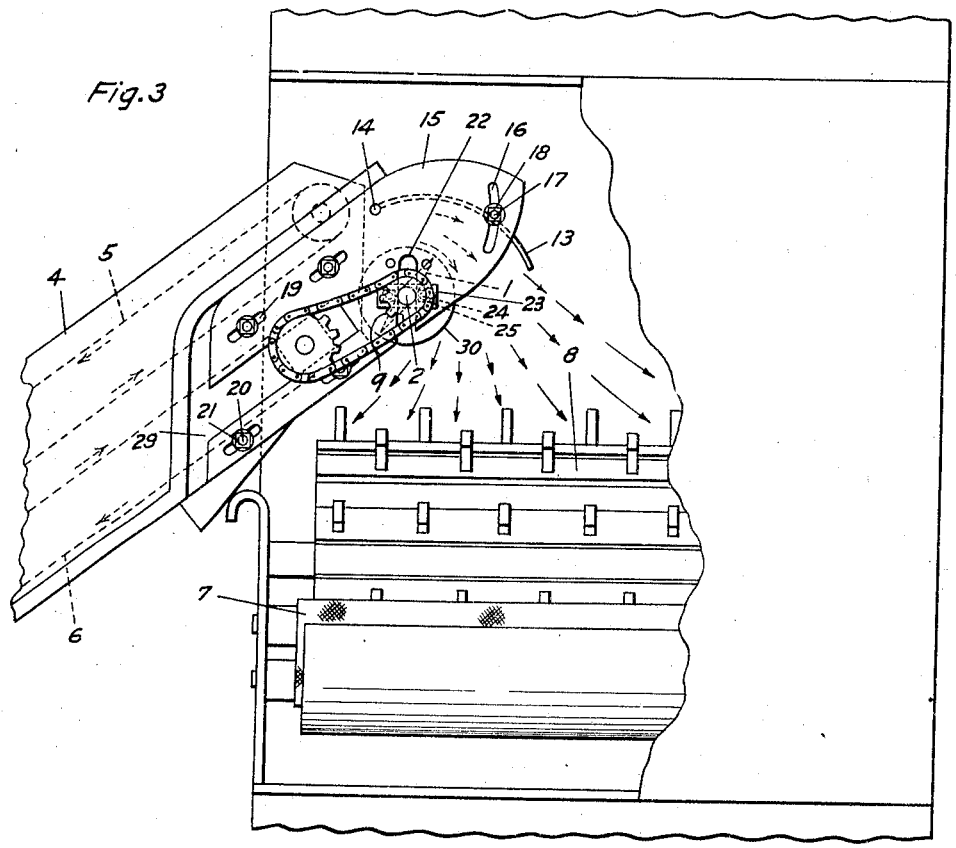
Fig. 3 is a view corresponding to Fig. 2, but showing a modified form of the invention, and showing means for adjusting the deflector roll.
Fig. 4 is an enlarged, fragmentary side view showing yielding means for regulating the hood.

The invention is illustrated as applied to a well known make of combine, using upper and lower conveyors delivering from the harvester into the feeder house of the thresher.

Referring to the drawings in detail, 1 indicates a rotary deflector of any suitable material and construction and proportions. As here shown, it is substantially a flat blade or plate of two or more sheets or plates riveted or otherwise suitably secured together and rigidly secured to a rod or other rotatable shaft 2 which is freely revolubly mounted in suitable bearings or hangers 3 suitably mounted on the housing walls 4 of the conveyors 5 and 6. These hangers, plates, or brackets simply extend in the same direction as the conveyors and sufficiently beyond to be parallel with and spaced from but close to the upper ends of the conveyors 5 and 6, which deliver the grain to the feeder house. Its position is such that it just exactly intercepts the incoming stream of grain. When mounted on the harvester it, necessarily, moves with the conveyors 5 and 6 and, therefore, at all times maintains the same position relatively to them. It is rotated, by means later disclosed, in a direction oppositely to the direction of travel of the incoming stream of grain. The flight of the grain from the conveyor toward the opposite side of the feeder house delivers it directly against this rotating deflector roll. The radial width of the deflector is such as to amply intercept the entire stream of grain. Its speed of rotation and distance from the conveyor ends is such that all incoming grain is instantly delivered downwardly and uniformly spread over the surface of the feeding conveyor 7, leading to the cylinder 8. It will be obvious that a wide range of constructions, proportions and materials may be resorted to for this rotary deflector, according to individual preference. The construction shown is simple and in actual use has proven highly efficient. It may be placed at various distances from the point at which the grain leaves the end of the harvester conveyors, provided it is so positioned as to adequately intercept the stream before it starts to spread or separate appreciably in its flight across the feeder house. The position shown places it at a point where, during rotation, the edges of the deflector will adequately clear the lower run of the upper conveyor 5 delivering the grain into the feeder house, at the point where the conveyor turns from the lower run to the upper run. Preferably, its axis is approximately mid-way between the adjacent runs of the conveyors 5 and 6. This provides a very compact arrangement, with the deflector in direct line of the incoming grain stream, yet with ample space between it and the lower conveyor to give plenty of clearance in operation.

This rotating paddle-wheel action of the deflector actually constitutes a positive feed and gives a uniform positive spreading action of the grain from its delivery point onto and over the surface of the conveyor 7. It delivers centrifugally outwardly from its center, as all similar rotating structures do, in an arc or circle-segment. The centrifugal delivery throughout that arc, being free and unimpeded, is substantially uniform and even. That arc extends across the bottom of the feeder house and, of course, across the conveyor 7 which substantially occupies the bottom of the feeder house and feeds the grain to the cylinder 8. Consequently, the grain will be spread uniformly across the entire width of the conveyor 7. All piling and all thinness is eliminated and with them all resulting defects and objections.

As the grain leaves the ends of the conveyors it pauses to fall by gravity. At this moment, the rotating deflector strikes it and forcefully delivers and scatters it downwardly, laterally, and uniformly over the conveyor in the bottom of the feeder house. This greatly speeds up the feed or flow of grain from the conveyors of the harvester through the cylinder and concave.

In the case illustrated, two conveyors 5 and 6 have been shown leading from the harvester knife and delivering into the feeder house. Where a single or lower conveyor, only, is used, the position of the deflector roll relatively thereto is substantially the same and it operates in the same way. In any case in which the loose grain is delivered in a stream into the feeder house, this invention is applicable and will operate in substantially the manner herein set forth. This, of course, applies equally, where the harvester and thresher are separate, as well as where there is a single combine machine. It also applies whether the deflector roll is mounted on and carried by the harvester or mounted on and carried by the walls of the feeder house.

A simple and efficient means of operating the invention is a chain and sprocket drive, though any one of a number of other well known arrangements may be used according to individual preference. In the instance illustrated, a simple sprocket wheel 9 is made fast on one end of shaft 2 and is driven by a sprocket chain 10 from a sprocket wheel 11 made fast on the corresponding end of the lower shaft 12 of the upper conveyor 5. This gives proper direction and speed of rotation for the deflector 1. The sprocket 11 could be put on the end of the upper shaft of the conveyor 5, if desired, with a shorter chain. Or bevel gears and a shaft could be substituted, in well known manner for the chain and sprocket. Or the drive could be taken from a shaft of the lower conveyor 6. Of course, where the machine does not have an upper conveyor 5, the drive will have to be taken from the lower conveyor. In that case, a gear will have to be interposed, in well known manner, in the drive, to reverse the direction of the drive—simply an additional gear.

Although hangers, etc., have been illustrated and described as a suitable means of supporting the shaft 2, it will be obvious that the side wall 4 of the harvester conveyors may be easily adequately extended to the proper point for mounting the shaft 2 therein, in much the same manner as the shafts of the upper rolls of the conveyors 5 and 6 are mounted therein. This is especially applicable where the deflector roll is applied at the factory.

In the modification or variation shown in Fig. 3 a hood 13 cooperates with the deflector roll which is slightly differently positioned than in the forms of Figures 1 and 2 and is rotated oppositely to the direction of rotation in those views. Instead of being positioned with its axis approximately in the plane mid-way between the adjacent runs of the conveyor belts of the harvester, it is positioned with its axis just slightly below the plane of the axes of the rolls or shafts of the lower conveyor and spaced from the upper end of said lower conveyor adequately for ample clearance. This places the deflector roll in the path of the incoming stream of grain but not in the center of the stream. But, it also places the deflector roll in a position slightly eccentric to hood 13 so that the radial distance between any point of the hood and any corresponding circumferential point of the deflector roll gradually increases in the direction of travel of the grain stream. In this form, the roll is rotated oppositely to the direction of rotation of the roll in the form of Figs. 1 and 2. As the grain meets this roll it is driven upwardly against the hood. Due to the feed of the harvester conveyors and the upward rotation of the roll, the space between the hood and the roll is filled with a fast flowing stream of grain which the hood confines to that space and keeps in contact with the roll, forcefully delivering it therefrom. The delivery space or outlet between hood and roll is slightly below the plane of the axis of the rolls of the lower harvester conveyor. At that point the grain is free to be forcefully centrifugally delivered downwardly and outwardly in an arc across the full width of the feeder conveyor delivering to the cylinder.

While it is true that deflector hoods have been used on combines at the delivery end of the harvester conveyors and at a point above the upper end of the upper conveyor, it is also a fact that they have not been, to my knowledge, either adjustable or combined or associated with a deflector roll or similar device. In the modified form of my invention, disclosed in Fig. 3, the hood is combined with a deflector, given a new position, and it is made adjustable.

The hood 13 may have one edge rolled about a pivot rod 14, the opposite ends of which are journaled in perforations or bearings on bracket plates 15 which are adjustably mounted on the sides of the frame carrying the harvester conveyor belts. When assembled, as will later appear, the pivot rod will be above the axis of the deflector roll and approximately in the plane of travel of the lower run of the upper conveyor of the harvester. This pivot rod acts as a hinge joint about which the hood may swing toward or from the rotary deflector. The extent of that swing is determined by the length of the arcuate slots 16 in which guide pins 17 play. These pins are secured to the back or outer face of hood 13 and, preferably, are threaded to receive clamping nuts 18. As the nuts are tightened, the hood will be held in one or another selected position relatively to the deflector roll. In this way the distance between the deflector roll and hood may be varied in accordance with the weight and height of grain being harvested, the heavier grain requiring the greater space, as also does the longer. In this way the operations of the deflector roll may be regulated in accordance with the character of grain being delivered to the feeder house.

Bracket plates 15 are provided with means for adjusting the deflector roll bodily in the direction of travel of the grain and also bodily at an angle to that direction. The first adjusting means comprises a plurality of slots 19 through the plates and adapted to receive bolts or the like and nuts 21 adapted to be turned thereon to clamp the plate in position. There are, of course, a pair of these bracket plates, one for each side, similarly slotted and similarly held in position. This gives corresponding adjustment for each end of the rotary deflector shaft.

The adjustment of the deflector at an angle to the stream of the grain is by inclined notches 22 leading upwardly from the lower edge of each plate 15 and in the general direction of grain flow. The shaft 2 of the deflector is movable along these notches by means of bearing blocks 23 in which its ends are journaled. These blocks may be secured in various selected positions by bolts 24 passed through aligned perforations in them and the bracket plates, and provided with clamping nuts 25 by which they may be tightened in position. From the above it will be been that the deflector roll may be easily removed from bracket plates 15 or adjusted as desired therein. Also, it will be seen that the side plates, deflector roll, and hood may be removed, as a unit, from the harvester conveyor frame.

In Fig. 4, a modified arrangement has been shown for adjusting the hood relatively to the deflector roll. This comprises yielding means for holding the hood down against the upward pressure of the grain. It may comprise a coil spring 26 and hooks 27 and 28. The springs would have their opposite ends connected, respectively to hooks 27 and 28, hooks 27 on the bracket plates 15 and hooks 28 on the ends of the pins 17, the tensions of the springs acting to draw the hood toward the deflector roll, as will be readily understood. Instead of the coil springs and hooks, one or more leaf springs may be used mounted near the pivot point of the pivot rod 14 and bearing upon the back or convex side of the hood, in well known manner. Other yielding means may be provided exerting a resistance against the pressure of the grain and acting to adjust the hood automatically to the grain pressure.

In order to permit the bracket plates 15 to fit snugly against the sides of the frame of the harvester conveyors, they are cut out or notched, as at 29 to slide along the projecting bearing blocks of the corresponding harvester conveyor roll.

At each end of the shaft 2 are filler blocks 30. These are of a slightly greater diameter than the rotary deflector roll and extend from the end of the deflector roll to the adjacent wall or face of bracket plates 15. They act to completely fill these spaces and, in that way prevent the winding of grain about the otherwise exposed shaft. Such winding of the grain would, of course, soon clog and hinder operations of the invention.

While wheat has been specifically referred to, this invention is fully applicable to many other grains, in fact all grains in which piling up in the feeder house, as here described, occurs, and it is meant to include all such within this application.

It will be understood, also, that the single blade or plate construction of the deflector roll is only one of many constructions thoroughly applicable and all included within this application.

While the aim and chief function of this invention is to produce uniform feeding and even spreading of the grain, there is an added function and advantage in this arrangement and construction. The deflector roll, rotating at relatively high speed, also has, within certain limits, a flailing action which, to that extent, gives the grain a partial or preliminary threshing.

It is thought that the construction, operation, and use of the invention will be clear from the preceding detailed description.

Many changes may be made in the construction, arrangement, and disposition of the several parts of the invention, within the scope of the appended claims without departing from the field of the invention and it is meant to include all such within this application wherein only one preferred form has been illustrated purely by way of example and with no intention to limit the claims in any degree thereby.

Having thus described my invention, what I claim and desire to protect by Letters Patent is:—

1. A material handling apparatus comprising a delivery conveyer, and a receiving conveyer disposed transversely of the delivery conveyer and having a receiving surface actuated to convey the material from the point of reception to the point of discharge from said receiving conveyer, in combination with means for distributing the material as discharged from said delivery conveyer and in the direction of discharge therefrom in a layer of substantially uniform thickness across substantially the full width of the receiving surface of said receiving conveyer, said distributing means comprising a rotary distributing blade having its axis of rotation extending transversely across the path of delivery at a point slightly beyond the discharge end of said delivery conveyer so that the distributing blade in rotating will intercept and break up the stream of material as discharged by the delivery conveyer into a zone of material driven by impact with said blade and directed by said distributing means, and means for rotating said distributing blade at a high rate of speed in comparison to the speed of feed of said delivery conveyer.

2. A material handling apparatus comprising a delivery conveyer, and a receiving conveyer disposed transversely of the delivery conveyer and having a receiving surface actuated to convey the material received from the point of reception to the point of discharge from said receiving conveyer, in combination with a beater form rotary distributing element extending transversely across and substantially at right angles to the central line of the stream of material as discharged by the delivery conveyer and having its axis disposed above the center of said stream at such point of discharge, and means for rotating said distributing element at a relatively high rate of speed in comparison to the speed of feed of said delivery conveyer to cause said distributing element to practically simultaneously break up the entire stream of material as discharged by said delivery conveyer into a zone of material driven tangentially of said distributing element by impact with the latter and downwardly and in the general direction of movement of the stream of material as discharged by said delivery conveyer, whereby the material discharged by said delivery conveyer will be distributed in a layer of substantially uniform thickness across substantially the full width of the receiving surface of the receiving conveyer.

3. A material handling apparatus comprising a delivery conveyer, a receiving conveyer disposed transversely of the delivery conveyer and receiving material discharged therefrom, a revoluble material distributor having a beater blade and with its axis of rotation extending transversely of the delivery conveyer and slightly spaced beyond the discharge end thereof and extending in the direction of delivery of the receiving conveyer, and means for rotating said distributor at a high rate of speed relative to the speed of discharge from said delivery conveyer, whereby the material will be distributed evenly across the width of the receiving conveyer.

DAVID S. NEAL.